United States Patent [19]

Uchida et al.

[11] Patent Number: 4,860,846
[45] Date of Patent: Aug. 29, 1989

[54] VEHICLE SPEED RESPONSIVE VARIABLE ASSIST POWER STEERING SYSTEM

[75] Inventors: Koh Uchida, Sagamihara; Takashi Kurihara, Atsugi; Makoto Miyoshi, Kawasaki, all of Japan

[73] Assignee: Nissan Motor Co., Ltd., Yokohama, Japan

[21] Appl. No.: 138,490

[22] Filed: Dec. 28, 1987

[30] Foreign Application Priority Data

Dec. 27, 1986 [JP] Japan ............... 61-313521

[51] Int. Cl.⁴ .............................. B62D 5/06
[52] U.S. Cl. .................... 180/141; 180/142
[58] Field of Search ............ 180/141, 142, 143, 132, 180/146, 149

[56] References Cited

U.S. PATENT DOCUMENTS

| | | | |
|---|---|---|---|
| 4,465,098 | 8/1984 | Bacardit | 137/625.21 |
| 4,512,238 | 4/1985 | Bacardit | 91/370 |
| 4,561,516 | 12/1985 | Bishop et al. | 180/142 |
| 4,561,521 | 12/1985 | Duffy | 180/142 |
| 4,565,115 | 1/1986 | Bacardit | 91/375 |
| 4,570,735 | 2/1986 | Duffy | 180/142 |
| 4,619,339 | 10/1986 | Futaba et al. | 180/143 |
| 4,632,204 | 12/1986 | Honaga et al. | 180/142 |
| 4,669,568 | 6/1987 | Kervagoret | 180/142 |
| 4,672,885 | 6/1987 | Kervagoret | 91/450 |

FOREIGN PATENT DOCUMENTS

| | | | |
|---|---|---|---|
| 0041887 | 12/1981 | European Pat. Off. | |
| 53560 | 6/1982 | European Pat. Off. | 180/132 |
| 2568843 | 2/1986 | France | |
| 47-30039 | 11/1972 | Japan | |
| 54-15232 | 2/1979 | Japan | |
| 56-38430 | 9/1981 | Japan | |
| 56-174363 | 12/1981 | Japan | |
| 57-30663 | 2/1982 | Japan | |
| 58-156459 | 9/1983 | Japan | |
| 161667 | 9/1983 | Japan | 180/142 |
| 1073 | 1/1985 | Japan | 180/142 |
| 61-43229 | 9/1986 | Japan | |
| 257365 | 11/1986 | Japan | 180/141 |

*Primary Examiner*—Kenneth R. Rice
*Attorney, Agent, or Firm*—Foley & Lardner, Schwartz, Jeffery, Schwaab, Mack, Blumenthal & Evans

[57] ABSTRACT

A control valve includes valve elements relatively displaceable in response to a predetermined variable (e.g., a steering torque) to define therebetween two parallel fluid flow paths connected between a fluid source and a fluid reservoir to produce pressure different in a power cylinder. The control valve a variable flow orifice that is arranged in series with regard to one of variable flow orifices of the parallel fluid flow paths, and a bypass path including has an externally controlled variable flow orifice valve that has an orifice area variable in response to a second predetermined variable which is different from the first predetermined variable.

4 Claims, 5 Drawing Sheets

VEHICLE SPEED RESPONSIVE VARIABLE ASSIST POWER STEERING SYSTEM

RELATED APPLICATIONS

The following two U.S. patent applications have been already filed and assigned to the same assignee of the present application.

(1) U.S. patent application Ser. No. 044,065, filed on Apr. 29, 1987, now pending.

(2) U.S. patent application Ser. No. 102,412, filed on Sept. 29, 1987, now pending.

The following four U.S. patent applications have been concurrently filed and assigned to the same assignee of the present application.

(3) U.S. patent application Ser. No. 07/138,480, filed Dec. 28, 1987, claiming priority based on Japanese Patent Application No. 61-313519 with a filing date of Dec. 27, 1986, (4) U.S. patent application Ser. No. 07/138,345 filed Dec. 28, 1987, claiming priority based on Japanese Patent Application No. 61-313517 with a filing date of Dec. 27, 1986, (5) U.S. patent application Ser. No. 07/138,402, filed Dec. 28, 1987, claiming priority based on Japanese Patent Application No. 61-313520 with a filing date of Dec. 27, 1986, (6) U.S. patent application Ser. No. 07/138,479 filed Dec. 28, 1987, claiming priority based on Japanese Patent Application No. 61-313518 with a filing date of Dec. 27, 1986,

BACKGROUND OF THE INVENTION

The present invention relates to a variable assist power steering system for vehicles and more particularly to a hydraulic control valve for use in a variable assist power steering system where it is desirable to have the degree of power assistance change with vehicle speed or some other variable related to the mode of operation of the vehicle.

A power assisted steering system can be characterized as operating under three driving conditions. Firstly during straight ahead driving at medium to high speeds, the power requirements on the steering system are extremely low and the degree of power assistance provided by the steering gear should be correspondingly minimized to permit the feedback of road "feel" from the tires to the driver. Secondary during medium and high speed passing and cornering maneuvers, a progressive increase in the level of power assistance with driver input torque is desirable. Nevertheless moderate driver input torques should still be maintained in order that the driver can feel adequately the dynamic state of the vehicle. Thirdly, and lastly, during low speed or parking maneuvers, the power requirements on the steering system may be large and fidelity of the steering system in terms of transmitting road feel is of little importance. Under these circumstances it is generally desirable to offer large degrees of power assistance, thereby minimizing the input torque required to be furnished by the driver.

The demands for optimum valve characteristics during the above three driving conditions conflict. Attempts have been made in the past to avoid the conflicting demands of the first and third driving conditions, namely the need to achieve a low level assistance for high to medium speed on-center driving while having high levels of assistance for low speed and parking maneuvers, by exploiting the fact that, for most valves, the degree of assistance varies with the flow of oil. For example, in one such widely used system, the power steering pump is caused to reduce the flow of oil as vehicle speed increases. However, this adversely affects valve performance in the second driving condition above, namely medium to high speed passing and cornering maneuvers, where progressive valve response is impaired due to the low oil flow. Also, in the event that such a steering maneouvre requires rapid turning of the steering wheel, the lower pump flow may be inadequate, rendering the power assistance momentarily inoperative. In another known system disclosed in JP 56-38430 B2, a bypass path with a variable flow valve is connected between both ends of the power cylinder and the variable flow valve is controlled in response to vehicle speed to cause bypass flow to increase as vehicle speed increases. However, this adversely affects valve performance in the second driving condition above, namely medium to high speed passing and cornering maneuvres, where progressive valve response is impaired due to the low gain.

The most satisfactory method of matching valve performance in all three of the above-mentioned conditions is modulating the valve characteristic with vehicle speed. A system which provides for better modulation of power assistance with vehicle speed is disclosed in U.S. Pat. No. 4,561,521 and can be seen to employ a rotary valve with primary and secondary valve portions. A speed sensitive valve is used to control oil flow from the pump to the secondary valve portion so that at high vehicle speeds a parallel flow path is provided between the rotary valve and the pump as oil is distributed to both primary and secondary valve portions. At low vehicle speeds, the speed sensitive valve restricts the flow of oil from the pump to the secondary valve portion. During parking maneuvres, the primary valve portion acts alone in the normal manner and the secondary valve portion is vented and not fed with oil from the pump. A change from a high level of power assist to a low level of power assist, and conversely, is effected by a variable force solenoid which is used to establish a parallel flow path from the pump to the secondary valve portion through a variable flow orifice. A speed sensing module controls the solenoid to open and close a variable orifice valve thus providing gradual changes in the level of power assist as the vehicle speed changes. The rotary valve used in this power steering system includes a valve housing having a circular opening which receives a valve sleeve. Positioned within the valve sleeve is an inner valve. The inner valve is formed with a primary set of longitudinal grooves forming a primary valve section, and also with a secondary set of longitudinal grooves forming a secondary valve section. The primary and secondary sets of longitudinal grooves register with primary and secondary sets of internal grooves formed in the internal wall of the valve sleeve, respectively. The primary and secondary sets of internal grooves are difficult to machine and require skilled labour because they have to be formed in the cylindrical internal wall of the valve sleeve with high precision. This has caused increased production steps and manufacturing cost.

SUMMARY OF THE INVENTION

The object of the present invention is to improve a variable assist power steering system which is free from the problem above.

The specific object of the present invention is to provide a hydraulic fluid circuit for a variable assist power steering system which can be embodied with valve grooves easy to machine.

According to the present invention, a control valve includes valve elements relatively displaceable in response to a predetermined variable (a steering torque) to define therebetween two parallel fluid flow paths connected between the fluid source and the fluid reservoir to produce pressure difference in the power cylinder in response to said predetermined variable. The two parallel fluid paths are provided with a plurality of first variable flow orifices, each having an orifice area variable in response to said predetermined variable. The control valve comprises a second variable flow orifice that has an orifice area variable in response to said predetermined variable, which second variable flow orifice is arranged in series with one of the first variable flow orifices. There is provided a bypass path provided with an externally controlled variable flow orifice valve that has an orifice area variable in response to a second predetermined variable (e.g., a vehicle speed) which is different from the predetermined variable. The bypass path has one end connected to one of said two parallel fluid flow paths at an intermediate portion between the second variable flow orifice and the adjacent one of variable flow orifices.

In one form of the present invention, the externally controlled variable flow orifice valve has one end connected between the two series variable flow orifices provided at the upstream portion of each flow path and arranged in parallel to a variable flow orifice provided at the downstream portion of the flow path.

In another form of the present invention, the externally controlled variable flow orifice valve is arranged in parallel to a variable flow orifice provided at the downstream portion of each flow path and has one end connected between the two series variable flow orifices provided at the downstream portion of the flow path.

In still another form of the present invention, the externally controlled variable flow orifice valve has one end connected between two series variable flow orifices provided at upstream portion of each flow path and an opposite end connected between the two series variable flow orifices provided at downstream portion of the flow path.

DETAILED DESCRIPTION OF THE INVENTION

Figure 1:
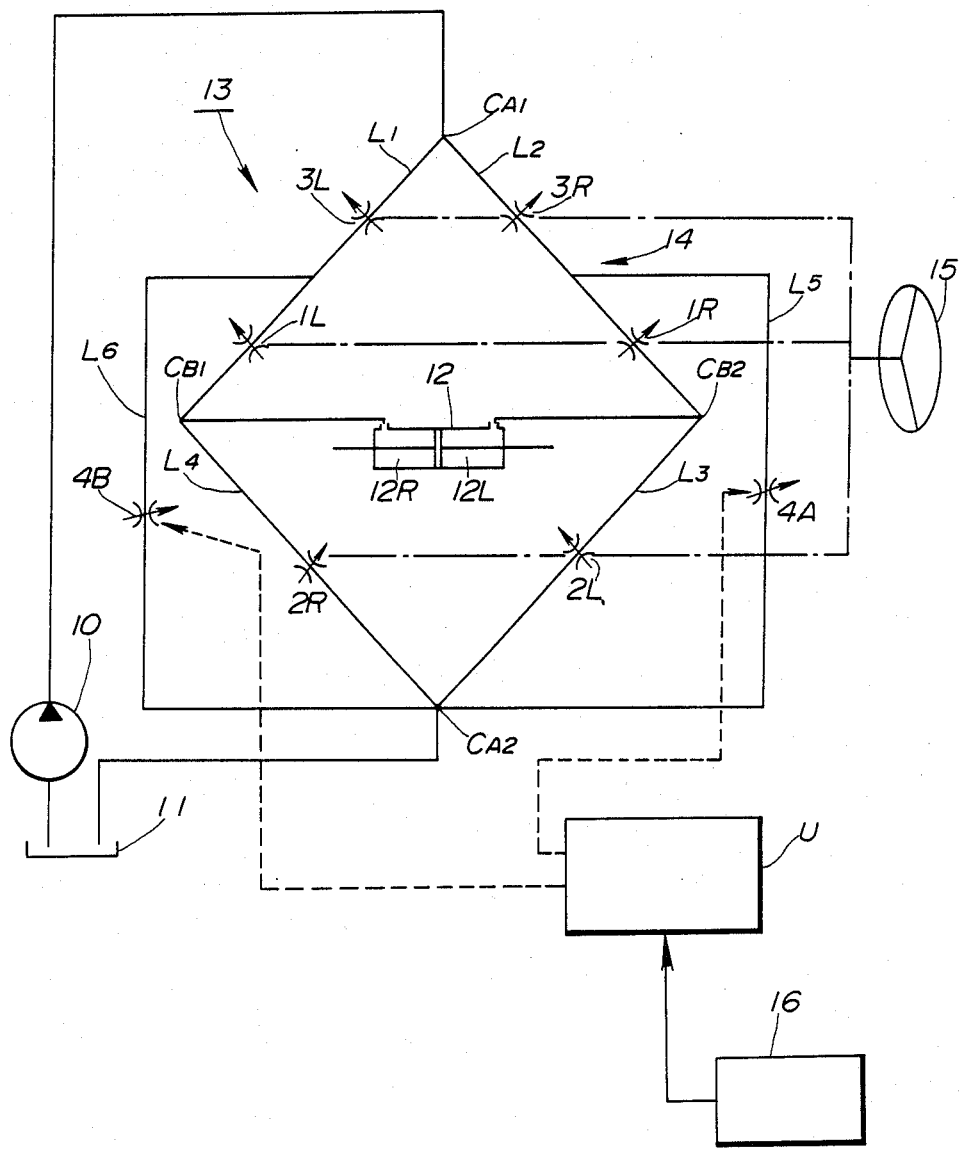
FIG. 1 is a circuit diagram of a first embodiment of the present invention.

FIG. 1 shows a hydraulic fluid circuit diagram which includes an oil pump 10 as a hydraulic fluid source, a tank 11 as a fluid reservoir, and a control valve 13 employing a fluid flow distributor circuit 14 of the open center type. Also shown are a steering wheel 15, a vehicle speed sensor 16, and a control unit U.

In the conventional manner, the fluid flow distributor circuit 14 includes two parallel flow paths $L_2-L_3$ and $L_1-L_4$ connected between a pump fluid supply port $C_{A1}$ and a fluid return port $C_{A2}$. The flow path $L_2-L_3$ has a cylinder connection port $C_{B2}$ connected to a cylinder chamber 12L of a power cylinder 12, while the other flow path $L_1-L_4$ has a cylinder connection port $C_{B1}$ connected to a cylinder chamber 12R of the power cylinder 12. Arranged in the upstream portion $L_2$ and the downstream portion $L_3$ of the flow path $L_2-L_3$ are two variable flow orifices 1R and 2L, respectively. Similarly, arranged in the unstream portion $L_1$ and the downstream portion $L_4$ of the other flow path $L_1-L_4$ are two variable flow orifices 1L and 2R, respectively. These variable flow orifices 1R, 2L, 1L and 2R are operatively associated with the steering wheel such that when the steering wheel 15 is in the central rest position, they are opened to provide unrestricted parallel flows of fluid between the fluid supply port $C_{A1}$ and the fluid return port $C_{A2}$. Turning the steering wheel 15 clockwise from the central rest position causes the variable flow orifices 1R and 2R to decrease their orifice areas as steering torque increases with the other two variable flow orifices 1L and 2L kept opened, and turning the steering wheel 15 counterclockwise from the central rest position causes the variable flow orifices 1L and 2L to decrease their orifice areas as steering torque increases with the other two variable flow orifices 1R and 2R kept opened.

In order to vary flow of fluid passing through the flow path $L_2-L_3$, an additional variable flow orifice 3R is arranged in the upstream flow path portion $L_2$ between the fluid supply port $C_{A1}$ and the variable flow orifice 1R and thus in series and upstream with regard the variable flow orifice 1R. Further, a bypass path $L_5$ has one end connected to the upstream portion $L_2$ at an intermediate point between the variable flow orifices 3R and 1R and extends toward the fluid reservoir 11 in such a manner as to allow fluid flow bypassing is not only the variable flow orifice 1R, but also the variable flow orifice 2L. Similarly, in order to vary flow of fluid passing through the flow path $L_1-Ll_4$, an additional variable flow orifice 3L is arranged in the upstream flow path portion $L_1$ between fluid supply port $C_{A1}$ and the variable flow orifice 1L and thus in series and upstream with regard to the variable flow orifice 1L. Further, a bypass path $L_6$ has one end connected to the upstream flow path portion $L_1$ at an intermediate point between the variable flow orifices 3L and 1L and extends toward the fluid reservoir 11 in such a manner as to allow fluid flow bypassing not only the variable flow orifice 1L, but also the variable flow orifice 2R. The bypass paths $L_5$ and $L_6$ include externally controlled variable flow orifice valves 4A and 4B, respectively, which has an orifice area variable with a vehicle speed V under control of the control unit U. The variable flow orifices 3L and 3R are operatively associated with the steering wheel 15 such that they are opened when the steering wheel 15 is in the central rest position. Turning the steering wheel 15 clockwise from the central rest position causes the additional variable flow orifice 3R to decrease its orifice area as steering torque increases with the other variable flow orifice 3L kept opened. Turning the steering wheel 15 counterclockwise from the central rest position causes the variable flow orifice 3L to decrease its orifice area as the steering torque increases with the variable flow orifice 3R kept opened.

Figure 2A:
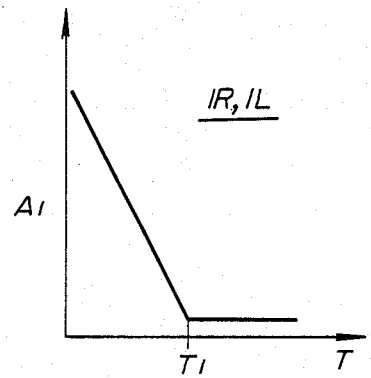
FIGS. 2(a) and 2(b) are diagrammatic chart showing how orifice areas of variable flow orifices vary against a steering input torque (T)
Figure 2B:
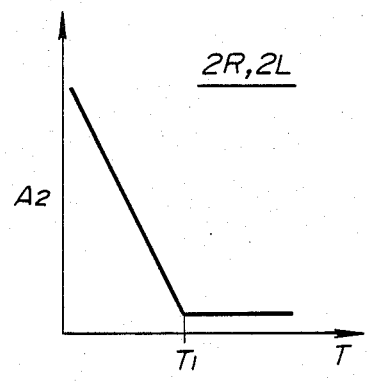
Figure 2C:
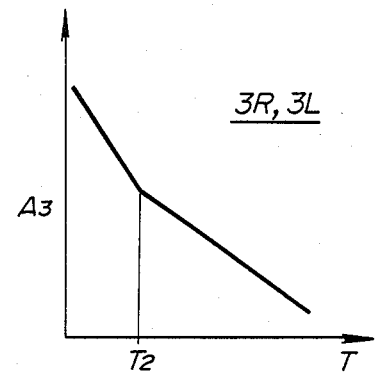
FIG. 2(c) is a diagrammatic chart showing how orifice area of variable flow orifice varies against steering torque.
Figure 2D:
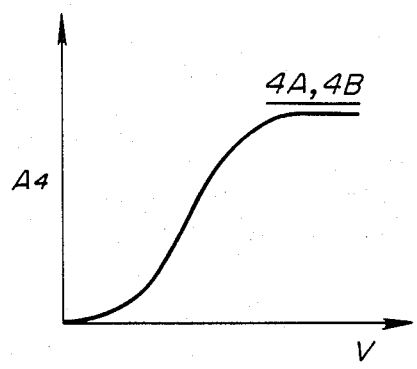
FIG. 2(d) is a diagrammatic chart showing how orifice area of an externally controlled variable flow orifice valve varies against vehicle speed.

FIG. 2(a) shows how the orifice area ($A_1$) of the variable flow orifice 1R or 1L decreases as the steering torque (T) increases. FIG. 2(b) shows how the orifice area ($A_2$) of the variable flow orifice 2R or 2L decrease as the steering torque T increases. FIG. 2(c) shows how the orifice area ($A_3$) of the variable flow orifice 3R or 3L decreases as the steering torque increases. Lastly, FIG. 2(d) shows how the orifice area ($A_4$) of the externally controlled variable flow orifice valve 4A and 4B increases as vehicle speed (V) increases. The variation characteristics shown in FIGS. 2(a), 2(b), 2(c), and 2(d) will be referred to again later.

Figure 3:
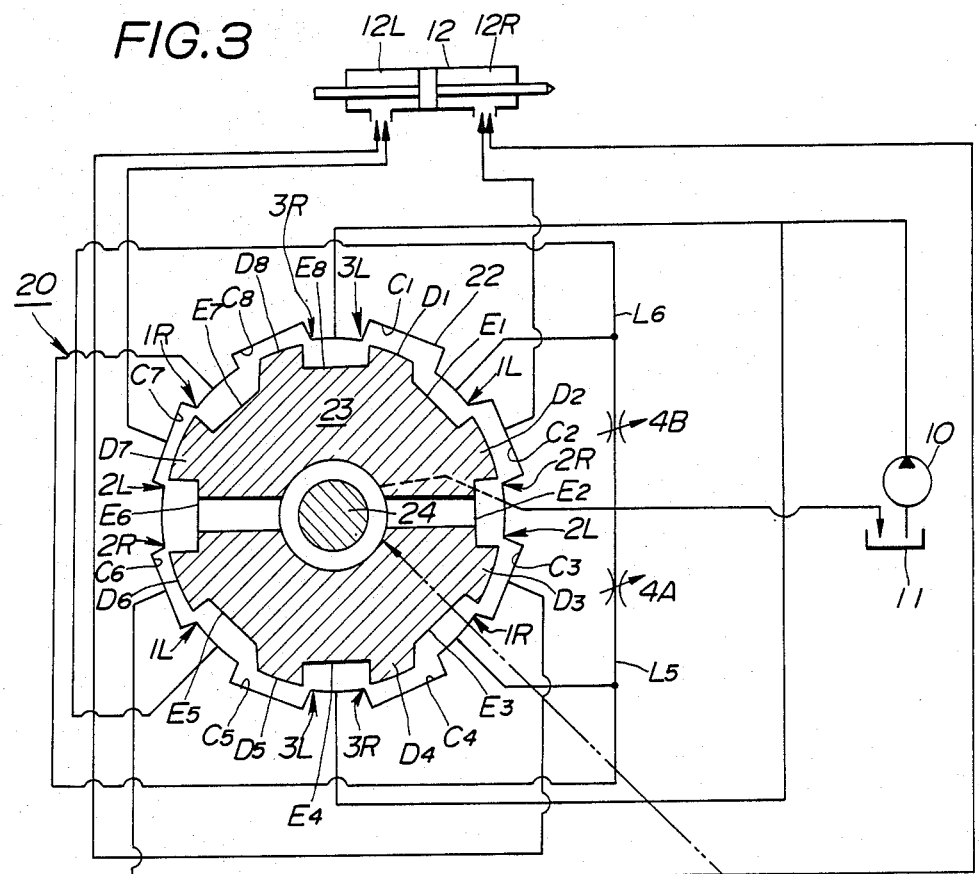
FIG. 3 is a valve sleeve with an inner valve therein when a rotary type control valve is in a central rest position.

Referring to FIG. 3, it will be explained how the fluid flow distributor circuit 14 is defined between two relatively displaceable valve elements, namely a valve sleeve 22 and an inner valve 23, of a rotary control valve 20 of the conventional type including a torsion bar 24.

As will be understood from FIG. 3, formed in the cylindrical inner wall of the valve sleeve 22 are eight longitudinally extending blind ended inner grooves $C_1$, $C_2$, $C_3$, $C_4$, $C_5$, $C_6$, $C_7$ and $C_8$ which are angularly separated one after another and separated by lands $D_1$ to $D_8$. Among them, a pair of diametrically opposed grooves $C_2$ and $C_6$ are connected to a cylinder chamber 12R of a power cylinder, while another pair of diametrically opposed grooves $C_3$ and $C_7$ are connected to a cylinder chamber 12L of the power cylinder.

Formed in the outer peripheral wall of the inner velve 23 are four main grooves $E_2$, $E_4$, $E_6$ and $E_8$, and four connection grooves $E_1$, $E_3$, $E_5$ and $E_7$. Each of the four main grooves $E_2$, $E_4$, $E_6$ and $E_8$ lies opposite one land separating the adjacent two inner grooves of the valve sleeve 22. Among them, the two main grooves $E_2$ and $E_6$ are connected via radial passages and an axial bore to a fluid reservoir 11, while the other two main grooves $E_8$ and $E_4$ face ports opening at the opposite lands of the valve sleeve 22, respectively, which ports are connected to a pump 10. In the central rest position as illustrated in FIG. 3, the main groove $E_8$ overlaps the adjacent inner grooves $C_8$ and $C_1$, the main groove $E_2$ overlaps the adjacent inner grooves $C_2$ and $C_3$, the main groove $E_4$ overlaps the adjacent inner grooves $C_4$ and $C_5$, and the main groove $E_6$ overlaps the adjacent inner grooves $C_6$ and $C_7$. Each of the four connection groove $E_1$, $E_3$, $E_5$ and $E_7$ is disposed between the adjacent two main grooves and overlaps the adjacent two inner grooves. Thus, when the rotary valve 20 in the central rest position as illustrated in FIG. 3, unrestricted balanced flow of fluid between the fluid supply grooves $E_8$, $E_4$ and the drain grooves $E_2$, $E_6$ is provided.

It will now be explained how the variable flow orifices 1R, 1L, 2R and 2L are formed during relative displacement of the inner valve 23 with regard to the valve sleeve 22. In this case two sets of such variable flow orifices are formed. Two variable flow orifices 1R are formed between the mating edges of the connection groove $E_7$ and the inner groove $C_7$ and between the mating edges of the connection groove $E_3$ and the inner groove $C_3$, respectively. The two variable flow orifices 1L are formed between the connection groove $E_1$ and the inner groove $C_2$ and between the mating edges of the connection groove $E_5$ and the inner groove $C_6$. The two variable flow orifices 2R are formed between the mating edges of the main groove $E_2$ and the inner groove $C_2$ and between the mating edges of the main groove $E_6$ and the inner groove $C_6$. The two variable flow orifices 2L are formed between the mating edges of the main groove $E_2$ and the inner groove $C_3$ and the mating edges of the main groove $E_6$ and $C_7$.

For modulating the valve characteristics, the two additional variable flow orifices 3R are formed, one between the mating edges of the main groove $E_8$ and the inner groove $C_8$, while the other between the mating edges of the main groove $E_4$ and the inner groove $C_4$, and two additional variable flow orifices 3L are formed, one between the the mating edges of themain groove $E_8$ and the inner groove $C_1$, while the other between the mating edges of the main groove $E_4$ and the inner groove $C_5$. Besides, a bypass path $L_5$ provided with an externally controlled variable flow orifice valve 4A has one ends opening to the connection grooves $E_3$ and $E_7$, and an opposite end connected to the fluid reservoir 11, and another bypass path $L_6$ provided with an externally controlled variable flow orifice 4B has one ends opening to the connection grooves $E_1$ and $E_5$, and an opposite end connected to the fluid reservoir 11.

In FIGS. 3, the rotary valve 20 is illustrated in its central rest position. Under this condition, assuming that the externally controlled variable flow orifice valves 4A and 4B are fully closed when the vehicle speed is zero or substantially zero, fluid under pressure from the pump 10 is divided evenly through the variable flow orifices 3R, 1R and 2L in one direction and through the variable flow orifices 3L, 1L and 2R in the opposite direction. The pressure drops at the level of flow restrictions provided by these orifices are, under this condition, substantially nil. the rotary valve thus has no effect on the power cylinder 12 and thus no effect on the steering system.

In the central rest position, assuming that the externally controlled variable flow orifice valves 4A and 4B are opened to increase their orifice area as the vehicle speed increases as shown in FIG. 2(d). In this case, the flow of fluid past through the orifice 3R splits into two flows, one passing through orifices 3R and 2L, the other passing through the bypass path $L_5$, while, the flow of fluid past through the orifice 3L splits into two flows, one passing through the orifices 1L and 2R, the other passing through the bypass path $L_6$. Although the amount of fluid passing through each of the flow paths $L_2$-$L_3$ and $L_1$-$L_4$ decreases as the vehicle speed increases, the flows of a fluid through these paths are balanced and thus the power cylinder 12 is not affected.

Figure 4:
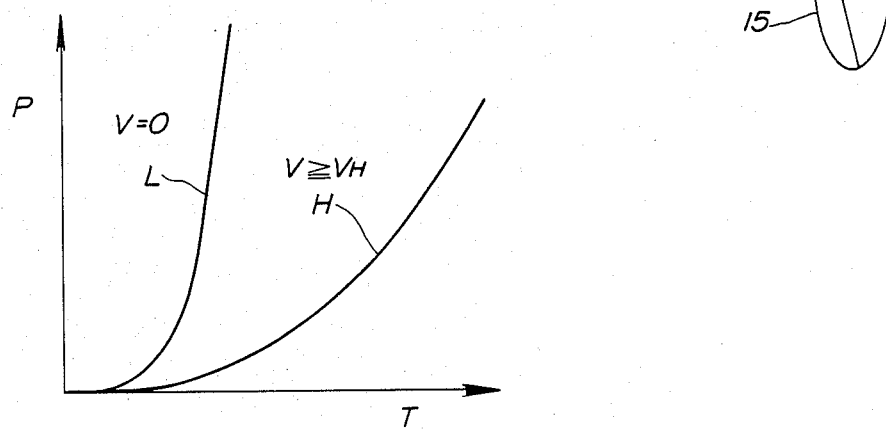
FIG. 4 is a chart showing power assist vs., steering torque characteristic curves for low vehicle and high vehicle speed.

In turning the steering wheel 15 at zero or substantially zero vehicle speeds, there is accordingly a relative displacement of the inner valve 23 with respect to the valve sleeve 22. In the case of a displacement of the inner valve 23 in a clockwise direction in FIG. 3, the variable flow orifices 3R, 1R and 2R effect a throttling of the fluid path inducing a pressure drop which in turn results in a pressure increase in the right cylinder chamber 12R of the power cylinder 12. In this case, since as will be understood from comparison of FIG. 2(a) with FIG. 2(c), the variable flow orifice 3R always provides a large orifice area than the orifice area provided by the variable flow orifice 1R, the valve characteristics are is determined by the orifices 1R and 2R only. Curve L shown in FIG. 4 shows power assist vs., steering torque characteristics at vehicle speed zero.

It will now be explained how the variable flow orifices 1R, 1L, 2R and 2L are formed during the relative displacement of the inner valve 23 with regard to the valve sleeve 22. In this case, three sets of such variable flow orifices are formed and arranged equi-angularly spaced. More specifically, three variable flow orifices 1R are formed between the mating edges of the main groove $E_2$ and the inner groove $C_2$, between the mating edges of the main groove $E_4$ and the inner groove $C_4$, and between the mating edges of the main groove $E_6$ and the inner groove $C_6$.

Let us now consider how the rotary valve 20 works at a high vehicle speed above a predetermined level $V_H$. The orifice area $A_4$ of the variable flow orifice valves 4A and 4B is maximum as shown in FIG. 2(d) regardless of variation of steering torque T. If the steering wheel 15 is turned clockwise during operation of the vehicle at such a high vehicle speed, there is accordingly a displacement of the inner valve 23 in a clockwise direction in FIG. 3, the variable flow orifices 3R, 1R and 2R decrease their orifice areas as shown in FIGS. 2(a), 2(b) and 2(c). In this case, there are formed fluid flows by-passing the orifice 1R and 2R via the bypass paths $L_5$ and $L_6$ (see FIG. 1) so that there is a decrease in flow of fluid directed to the cylinder chamber 12R resulting in the least pressure increase in the cylinder chamber 12R of the power cylinder. The cylinder chamber 12L is in direct communication with the fluid reservoir 11. It will be understood that, under this condition, the variable flow orifices 1R and 2R are in parallel to the orifice valves 4A and 4B, respectively. The increase of pressure P (i.e., a power assist) against steering torque T at vehicle speeds higher than $V_H$ is illustrated by a characteristic curve H in FIG. 4. As shown in FIG. 2(c), as steering torque T increases, the orifice area $A_3$ of the variable flow orifice 3R decreases at a rate less than a rate at which the orifice area $A_2$ decreases, and after the steering torque T has increased beyond a predetermined value $T_2$, the orifice area $A_3$ decreases at a further less rate. The shape of the characteristic curve H is determined mainly by the variable flow orifice 3R. Thus, any desired high vehicle speed power assist characteristic may be obtained by suitably designing the orifice varying characteristics of the variable flow orifice 3R.

In turning the steering wheel 15 during operation of the vehicle at a medium speed that is below the predetermined vehicle speed $V_H$, the variable flor orifice valves 4A and 4B opens under the control of the control unit U supplied with the output of the vehicle speed sensor 16 to provide an orifice area corresponding to a vehicle speed detected. The manner of modulation of a pressure increase in the cylinder chamber 12R of the power cylinder 12 is such that, with the same steering torque, the hydraulic fluid pressure in the cylinder chamber of the power cylinder 12 or power assist decreases as the vehicle speed increases, while at the same vehicle speed, the power assist increases as the steering torque increases. Thus, the power assist characteristic curves at intermediate vehicle speeds can be drawn between the two characteristic curves L and H in FIG. 4 and thus the power assist gradually decreases as the vehicle speed increases even though sufficient power assist is secured in response to a relatively large steering torque.

Figure 5:
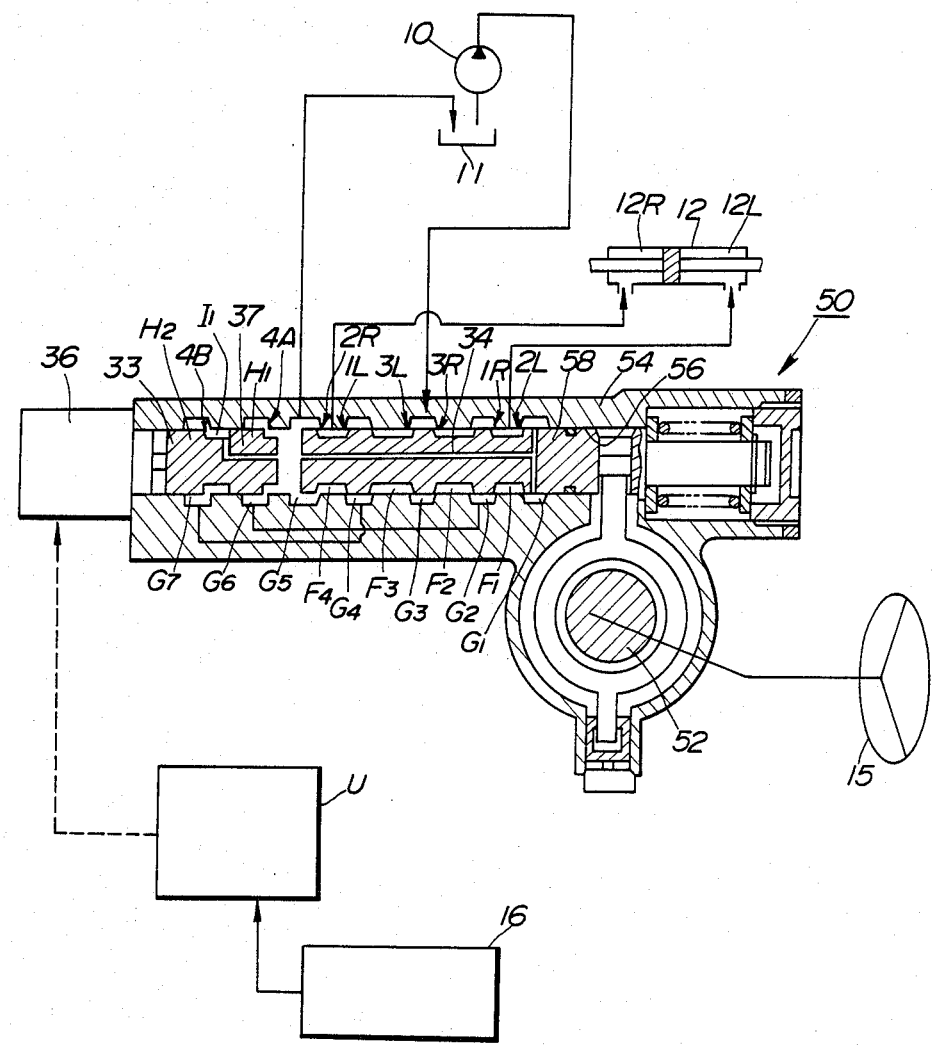
FIG. 5 is a longitudinal section of a spool typecontrol valve when the spool type control valve is in a central rest position.

Referring to FIG. 5, there is shown a spool type control valve 50 embodying the distributor circuit 14 shown in FIG. 1. Reference numeral 52 designates a steering torque input shaft received in a housing 54 which includes a valve bore 56 receiving a valve spool 58. In FIG. 5, the spool 58 displaces longitudinally as the steering input shaft 52 displaces from the illustrated central rest position angularly. For example, a clockwise displacement of the shaft 52 relative to the housing 54 causes a displacement of the spool 58 to the right relative to the bore 56. Formed in the inner wall of the valve bore 56 are a first set of five annular inner grooves $G_1$ and $G_5$ which are axially spaced and separated by a land, and a second set of two annular inner grooves $G_6$ and $G_7$ which are axially spaced and separated by a land. Formed in the outer peripheral wall of the spool 58 are four circumferentially extending main grooves $F_1$ to $F_4$. The valve spool 58 is formed with an axial passage 34 and radial passages which serve as part of a fluid return passage leasing to a fluid reservoir 11.

Received also by the valve bore 56 is a second spool 33 axially movable by means of a solenoid operated actuator 36. Formed in the outer peripheral wall of the second spool 33 are two lands $H_1$ and $H_2$ with a circumferential groove $I_1$ therebetween. This groove $I_1$ is connected via an axial passage 37 to a fluid reservoir 11. As will be readily understood from FIG. 5, various variable flow orifices 1R, 1L, 2R, 2L, 3R, and 3L are formed between the mating edges of the circumferential grooves $F_1$ to $F_4$ and the inner grooves $G_1$ to $G_5$, and variable flow orifice valves 4A and 4B are formed between the edges of the lands $H_1$ and $H_2$ and the mating edges of the inner grooves $G_6$ and $G_7$ as the second spool 33 displaces longitudinally via the actuator 36 as vehicle speed varies.

Figure 6:
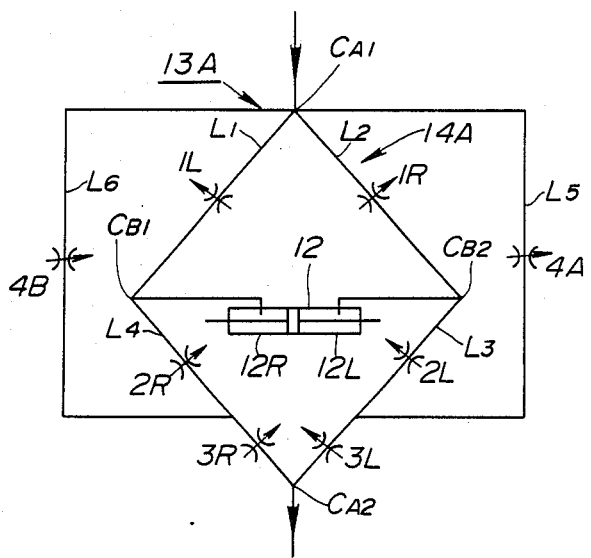
FIG. 6 is a circuit diagram of a second embodiment of a flow distributor circuit.

Referring to FIG. 6, a second embodiment of a control valve 13A employing a fluid flow distributor circuit 14A is described. This circuit is different from the circuit 14 in that each of bypass paths $L_5$ or $L_6$ has an upstream end connected to a pump, not shown, and a downstream end connected to one of downstream fluid flow path portions $L_3$ and $L_4$ at an intermediate point between two serially connected variable flow orifices 2L and 3L or 2R and 3R.

Figure 7:
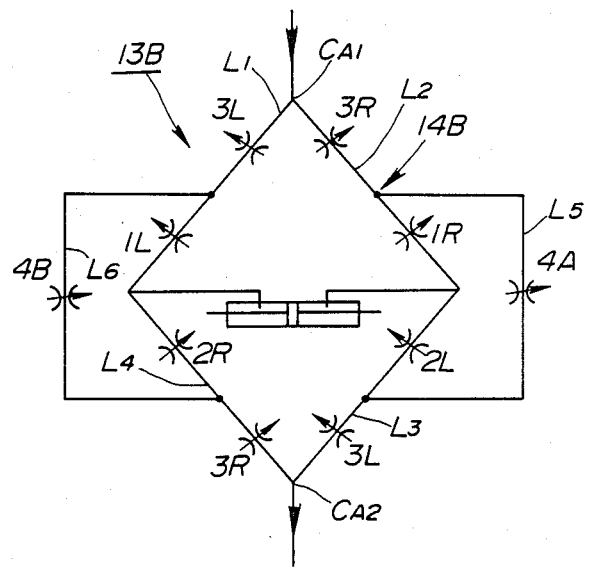
FIG. 7 is a circuit diagram of a third embodiment of a flow distributor circuit.

Lastly, referring to FIG. 7, a third embodiment of a control valve 13B employing a fluid distributor circuit 14B is described. This circuit is different from the circuit 14 in that each of bypass paths $L_5$ and $L_6$ has its downstream end connected to one of downstream fluid path portions $L_3$ and $L_4$ at an intermediate point between serially connected variable flow orifices 2L and 3L or 2R and 3R.

In the previously described examples, vehicle speed is detected and used as a variable on which the control unit U controls electric current passing through the solenoid operated actuator for the externally controlled variable flow orifice valves 4A and 4B. More particularly, the externally controlled variable flow orifice valves 4A and 4B open simultaneously proportionally as vehicle speed increases.

If desired, the externally controlled orifice valve 4 may be controlled in response to some other variable related to a driver's preference or mode of operation of the vehicle. For this end, a manually operable selector is disposed near the vehicle driver's seat and a control unit is supplied with the output of the manual selector such that the driver can vary electric current passing through a solenoid actuator for an externally controlled variable orifice valve 4 until th level of a power assist fits his/her preference.

Some other variable related to a road friction coefficient may be used for controlling orifice area of the externally controlled variable flow orifice valve 4. One example of a sensor to detect such variable is a switch coupled to a vehicle's wiper switch. In this case, the solenoid current increases as wiper speed increases, thus decreasing the level of power assist in response to wiper speed. This in advantageous because it is the common behaviour of a vehicle's driver to increase the wiper speed as rain fall gets heavier. A rain drop sensor may be used as a road friction coefficient sensor. It is possible to detect road friction coefficient by computing a difference in rotation between a traction road wheel and a non-traction road wheel or directly detect road friction coefficient by detecting the amount of splash by a traction road wheel. In using the variable related to the road friction coefficient, it is also possible to modify the solenoid current that is determined based on vehicle speed in response to the friction coefficient.

The solenoid current may be varied to modify the orifice area vs., vehicle speed characteristics shown in FIG. 2(d) in response to frequency of acceleration and deceleration which the vehicle is subject to. The solenoid current may be varied in accordance with judgement made based on steering wheel angle and speed at which the steering wheel is turned. Lastly, the solenoid current may be varied in response to load imposed on the vehicle drigible road wheels.

What is claimed is:

1. A variable assist power steering system for vehicles including a hydraulic fluid source, a fluid reservoir, and a hydraulic pressure operated power cylinder adapted to be connected to a steering linkage, comprising:

a control valve including valve elements relatively displaceable in response to a predetermined variable to define therebetween two parallel fluid flow paths connected between the fluid source and the fluid reservoir to produce pressure difference in the power cylinder in response to said predetermined variable, said two parallel fluid paths including a plurality of first variable flow orifices, each having an orifice area variable in response to said predetermined variable, wherein said control valve comprises a second variable flow orifice that has an orifice area variable in response to said predetermined variable, said second variable flow orifice being arranged in series with one of said first variable flow orifices, and a bypass path provided with an externally controlled variable flow orifice valve that has an orifice area variable in response to a second predetermined variable which is different from said predetermined variable, said bypass path having one end connected to one of said two parallel fluid flow paths at an intermediate portion between said second variable flow orifice and the adjacent one of said variable flow orifices.

2. A variable assist power steering system as claimed in claim 1, wherein said second variable flow orifice and said bypass path are connected in series.

3. A variable assist power steering system as claimed in claim 1, wherein said first predetermined variable is a steering torque, and said second predetermined variable is a vehicle speed.

4. A variable assist power steering system as claimed in claim 3, wherein said second variable flow orifice has no modulation effect on the valve characteristics determined by said first variable flow orifices during operation at zero vehicle speed, and said second variable flow orifice determines and dominates the valve characteristic a vehicle speed higher than a predetermined vehicle speed.

* * * * *